(12) United States Patent
Bisplinghoff

(10) Patent No.: US 6,490,437 B1
(45) Date of Patent: Dec. 3, 2002

(54) TELEPHONE-HOLDER MOUNTING SUPPORT FOR MOTOR VEHICLES

(76) Inventor: Gisela Bisplinghoff, Ketteler Strasse 20, Schloss Holte-Stukenbrock (DE), 33758

( * ) Notice: Subject to any disclaimer, the term of this patent is extended or adjusted under 35 U.S.C. 154(b) by 0 days.

(21) Appl. No.: 09/489,239

(22) Filed: Jan. 21, 2000

(30) Foreign Application Priority Data

Mar. 8, 1999 (DE) .......................................... 199 10 076

(51) Int. Cl.[7] .................................................. H04B 1/38
(52) U.S. Cl. .......................... 455/90; 455/345; 455/569
(58) Field of Search ........................... 455/90, 550, 569, 455/575, 344, 345; D14/137, 138, 140; 379/428.01, 428.02, 433.01, 434, 447, 449, 454, 455, 430; 156/39, 212, 214

(56) References Cited

U.S. PATENT DOCUMENTS

| | | | | |
|---|---|---|---|---|
| 4,303,722 A | * | 12/1981 | Pilgrim ........................ | 156/39 |
| 4,361,613 A | * | 11/1982 | Bogner et al. ............... | 156/212 |
| 5,187,744 A | * | 2/1993 | Richter ........................ | 379/449 |
| 5,202,913 A | * | 4/1993 | Lang et al. .................. | 455/569 |
| 5,372,668 A | * | 12/1994 | Bracesco ..................... | 156/214 |
| 5,754,962 A | * | 5/1998 | Griffin ......................... | 455/569 |
| 6,078,825 A | * | 6/2000 | Hahn et al. .................. | 455/569 |
| 6,138,041 A | * | 10/2000 | Yahia .......................... | 455/569 |
| 6,230,029 B1 | * | 5/2001 | Hahn et al. .................. | 455/569 |
| 6,266,544 B1 | * | 7/2001 | Tomura et al. ............... | 455/90 |

\* cited by examiner

*Primary Examiner*—Nay Maung
*Assistant Examiner*—Quochien B. Vuong
(74) *Attorney, Agent, or Firm*—Richard M. Goldberg

(57) ABSTRACT

A telephone-holder mounting support for vehicles including a mounting surface for a telephone-holder, charger adapter or similar object, an arrangement for securing the mounting support inside a vehicle and a cigarette lighter socket.

3 Claims, 2 Drawing Sheets

TELEPHONE-HOLDER MOUNTING SUPPORT FOR MOTOR VEHICLES

BACKGROUND OF THE INVENTION

The invention relates to a telephone-holder mounting support for vehicles, with a surface for mounting a telephone-holder, charger adapter or similar, objects and means of securing it inside the vehicle.

Standard vehicles, especially passenger cars, do not come equipped with any pre-manufactured device for securing a telephone-holder. Telephone-holders of the type referred to here serve to detachably hold mobile telephones used in vehicles. They frequently also function as charger adapters for charging up a telephone battery. Special holders, which we will refer to in this context as mounting supports, on which a telephone-holder or charger adapter can be mounted, have therefore been available on the market for a long time. The shapes of these mounting supports differ in line with the particular vehicle type, but always feature a mounting surface, possibly with ready-made bores, to which can be secured a telephone-holder and suitable means of fixing the support somewhere in the vicinity of the vehicle dashboard, more or less within easy reach of the driver.

If the telephone-holder is designed as a charger adapter, a connection to the vehicle's power supply has to be provided. In many instances, this power connection is contrived behind the panelling of the dashboard, although this often involves considerable fitting work. It is therefore widespread practice to use the socket of the cigarette lighter plug, which is available in most vehicles, as a socket for the cigarette lighter plugs often provided on charger adapters.

This results in a number of disadvantages. Firstly, the telephone-holder and the cigarette lighter may happen to be positioned quite far apart, so that the connecting lead has to be trailed the same length across the dashboard. In some vehicles the socket of the cigarette lighter is located under an ashtray flap so that it is impossible to shut the ashtray when the plug is plugged in. And finally, the cigarette lighter can no longer be used for its original purpose.

SUMMARY OF THE INVENTION

The invention is therefore based on the task of creating a mounting support of the above-mentioned type, which simplifies and extends the ways of supplying power to mobile telephones.

For telephone-holder mounting supports of the above type, this task is solved by incorporating a cigarette lighter socket in the mounting support.

This means that a cigarette lighter plug running out from the charger adapter of a mobile telephone can be plugged into the socket for the purpose of supplying power directly, and without a long detour. Hence it is not necessary to run the connecting lead over to vehicle's cigarette lighter. Furthermore, the socket can also be used as an additional power connection for other appliances such as e.g. a car vacuum, air pumps, manual headlights etc.

The socket is preferably disposed somewhere on the mounting support such that it opens out downwards, so that it is not normally visible. This type of arrangement is particularly easy to achieve if the mounting support is made from a block of foamed plastic which provides both the mounting surface on the one hand, and the option of incorporating a cigarette lighter socket on the other hand.

In all other respects, the mounting support can be designed in any way. It can be a sheet metal plate, or any other construction, including an injection moulded plastic element or similar.

BRIEF DESCRIPTION OF THE DRAWINGS

Preferred examples of embodiments of the invention will be described in more detail below with reference to the enclosed drawings, in which.

DETAILED DESCRIPTION

Figure 1:
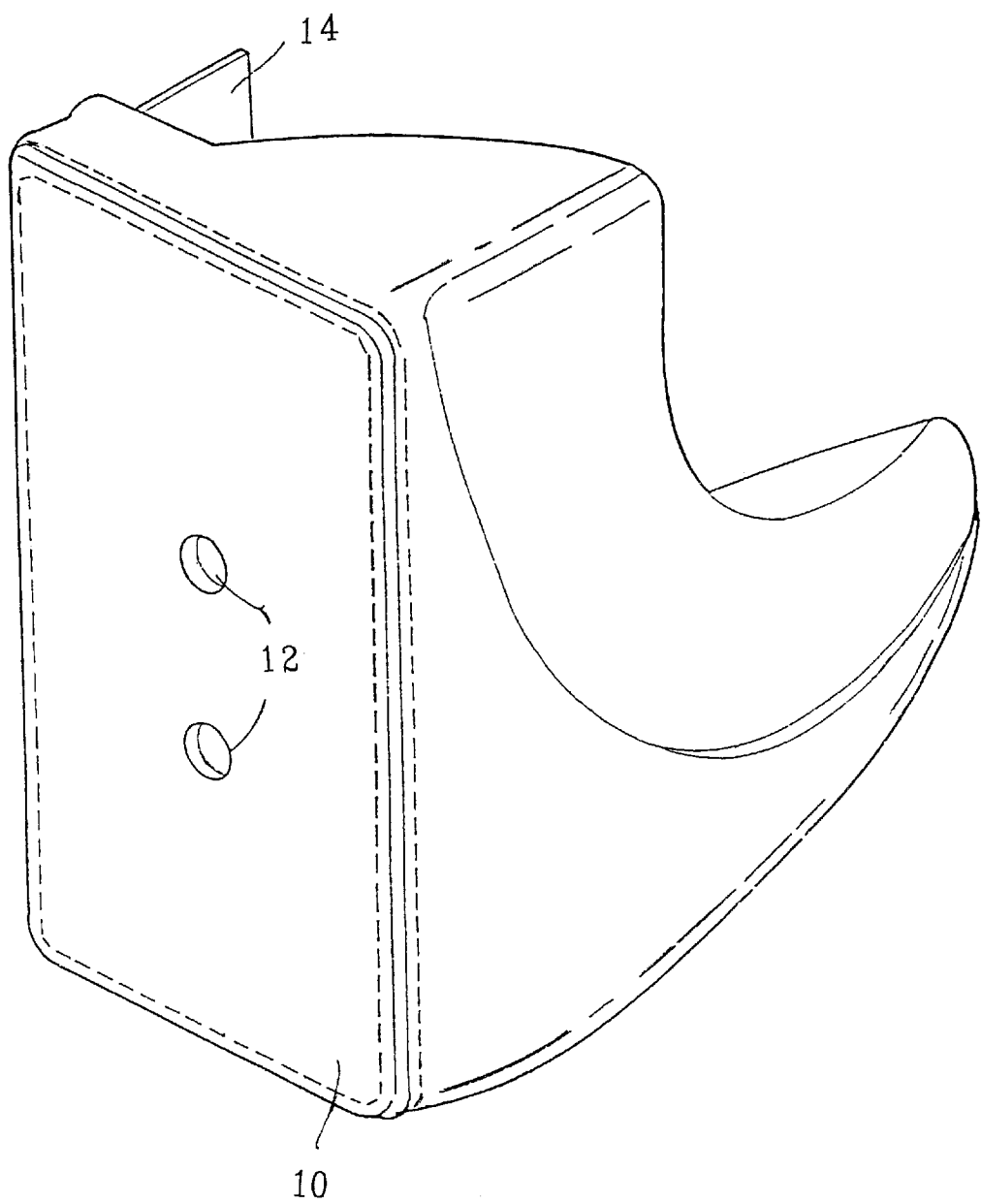
FIG. 1 is a perspective view of a telephone-holder mounting support for vehicles in the form of a block of foamed plastic.

FIG. 1 shows a mounting support according to the invention in the form of a block of foamed plastic. Mounting supports of this kind are already known of per se. On the side facing the observer the mounting support has a flat, rectangular mounting surface 10. In the mounting surface there are two ready-made bores for the purpose of securing a telephone-holder, possibly in the shape of a charger adapter. Holders of this type are widely known, and not shown here.

On the side opposite mounting surface 10, the mounting support has a markedly curved contour dictated by the position in which it is secured to the vehicle dashboard or centre console. The corner of a sheet metal angle 14 is visible towards the back of FIG. 1, serving e.g. to secure the mounting support to the dashboard after removing a dashboard panel which is not shown here. Further details of the features for adapting the mounting support to a particular vehicle, and for securing it inside the vehicle, will not be given here as this invention relates to mounting supports of the said type for any type of vehicle.

Figure 2:
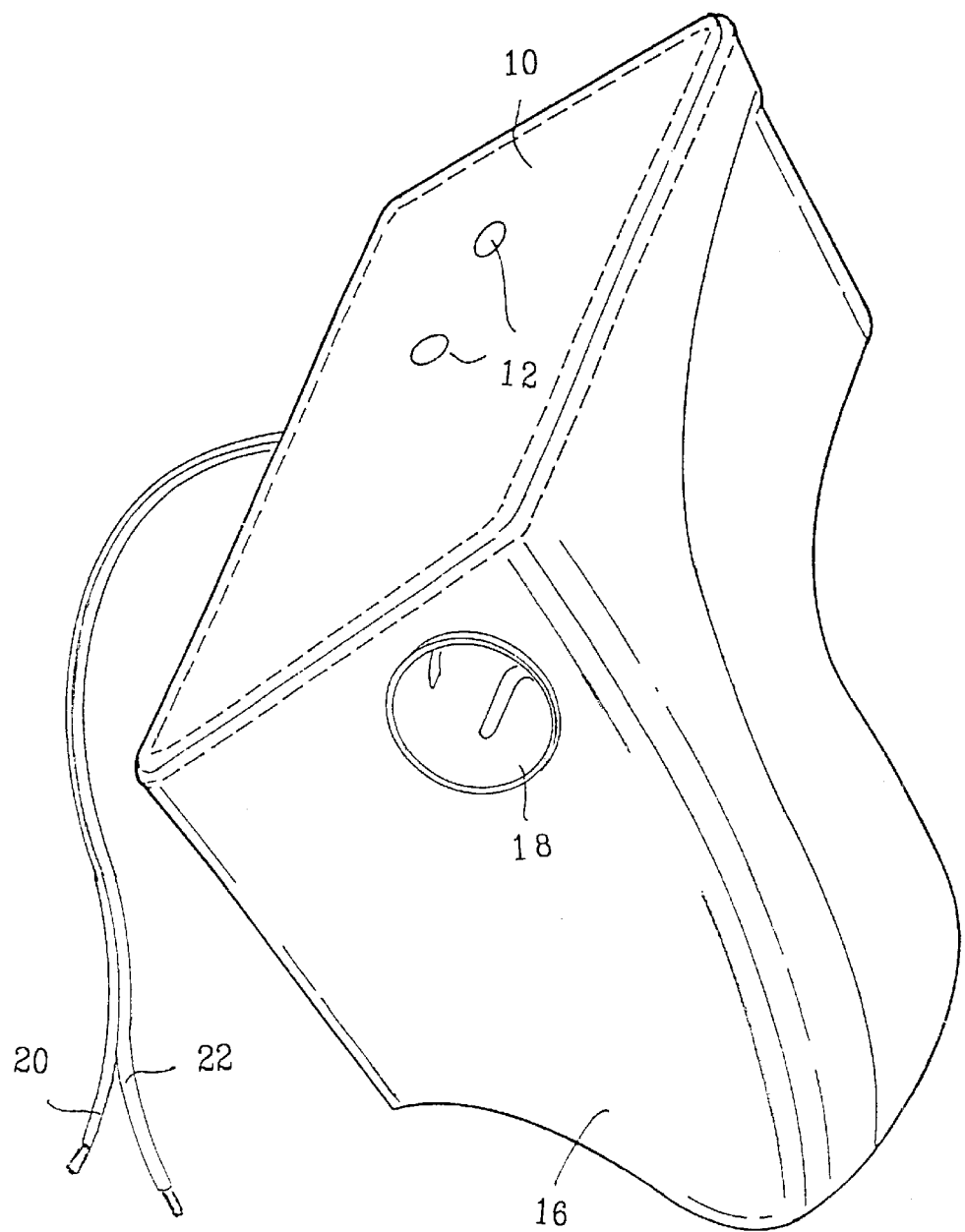
FIG. 2 is another perspective view showing an angled view of the mounting support from below in relation to FIG. 1.

FIG. 2 reveals that the mounting support of FIG. 1 has, in addition to mounting surface 10, a largely flat underside 16 that is essentially horizontal when installed. Located on this underside 16 is the circular opening of a cigarette lighter socket 18, which can be of the usual shape.

As the mounting support of FIGS. 1 and 2 is made from foamed plastic, there is no difficulty in foaming the socket 18 into the mounting support. Connecting wires 20, 22 can be foamed in at the same time and run out of the mounting support so that they can be installed under the vehicle dashboard panelling and connected to the vehicle power supply.

The main advantage of disposing socket 18 in the underside 16 is that the socket is invisible when not in use. Hence the socket remains discreetly hidden away, and there is no need to worry that the driver or passenger might unintentionally put a finger or a metallic object, such as e.g. a car key, into the socket.

It has already been made clear above that the way the mounting support is designed here as a foamed part is only one example of an embodiment. The mounting support could also be e.g. an injection moulded plastic part or even a part made from sheet metal, wood or other materials.

What is claimed is:

1. A telephone-holder mounting support for vehicles, comprising:
   a foamed plastic block adapted to be fixed to one of a dashboard and middle console of a vehicle, said block including:
   a first side with a mounting surface for mounting one of a telephone-holder and charger adapter on the first side, a second side with a contour adapted to a receiving position at the one of the dashboard and middle console of the vehicle, a third side with a surface having a round entry opening, a lighter socket foamed into the foamed plastic block behind the round entry opening, and connecting wires foamed into the foamed plastic block and electrically connected with the lighter socket, the connecting wires having ends protruding out of the foamed plastic block for connection with a current source of the vehicle.

2. A telephone-holder mounting support according to claim 1, wherein the third side has a surface which is downwardly oriented when installed.

3. A telephone-holder mounting support according to claim 1, wherein the mounting surface on the first side lies in an installed position of the foamed plastic block in facing relation to a telephone user.

* * * * *